(12) United States Patent
Worden et al.

(10) Patent No.: US 6,363,574 B2
(45) Date of Patent: Apr. 2, 2002

(54) VACUUM CLEANER

(75) Inventors: Michael Worden, Valrico; Curt J. Schulze, Lakeland; Jon Brigner, Lutz; Jack P. Christen, Wesley Chapel, all of FL (US)

(73) Assignee: Pullman-Holt Corporation, Tampa, FL (US)

( * ) Notice: Subject to any disclaimer, the term of this patent is extended or adjusted under 35 U.S.C. 154(b) by 0 days.

(21) Appl. No.: 09/793,051

(22) Filed: Feb. 26, 2001

Related U.S. Application Data

(63) Continuation of application No. 09/383,131, filed on Aug. 25, 1999.
(60) Provisional application No. 60/100,742, filed on Sep. 17, 1998.

(51) Int. Cl.[7] .................................................. A47L 9/22
(52) U.S. Cl. ........................ 15/413; 15/326; 15/327.6; 15/353
(58) Field of Search ............................... 15/326, 327.2, 15/327.6, 353, 412, 413

(56) References Cited

U.S. PATENT DOCUMENTS

| | | | | |
|---|---|---|---|---|
| 2,884,185 | A | * | 4/1959 | Dolan |
| 3,815,172 | A | * | 6/1974 | Fromknect et al. |
| 4,088,424 | A | * | 5/1978 | Hyatt et al. |
| 4,435,877 | A | * | 3/1984 | Berfield |
| 5,030,257 | A | * | 7/1991 | Kasper et al. |
| 6,175,988 | B1 | * | 1/2001 | White et al. |
| 6,192,551 | B1 | * | 2/2001 | Roth |

* cited by examiner

Primary Examiner—Terrence R. Till
(74) Attorney, Agent, or Firm—Adan Ayala

(57) ABSTRACT

A vacuum cleaner includes a tank assembly having an open end, a cap assembly removably connected to and generally closing off the open end, an inlet assembly disposed on one of the tank and cap assemblies, an exit opening disposed on one of the tank and cap assemblies, a vacuum source connected to one of the tank and cap assemblies for drawing process air through the inlet assembly, a filter assembly disposed between the inlet assembly and the exit opening, the filter assembly comprising a filter, and a filter bag assembly covering at least part of the filter, wherein the filter bag assembly comprises a filter bag and a drain tube connected to the filter bag. Preferably, the drain tube is integrally built into the filter bag.

5 Claims, 16 Drawing Sheets

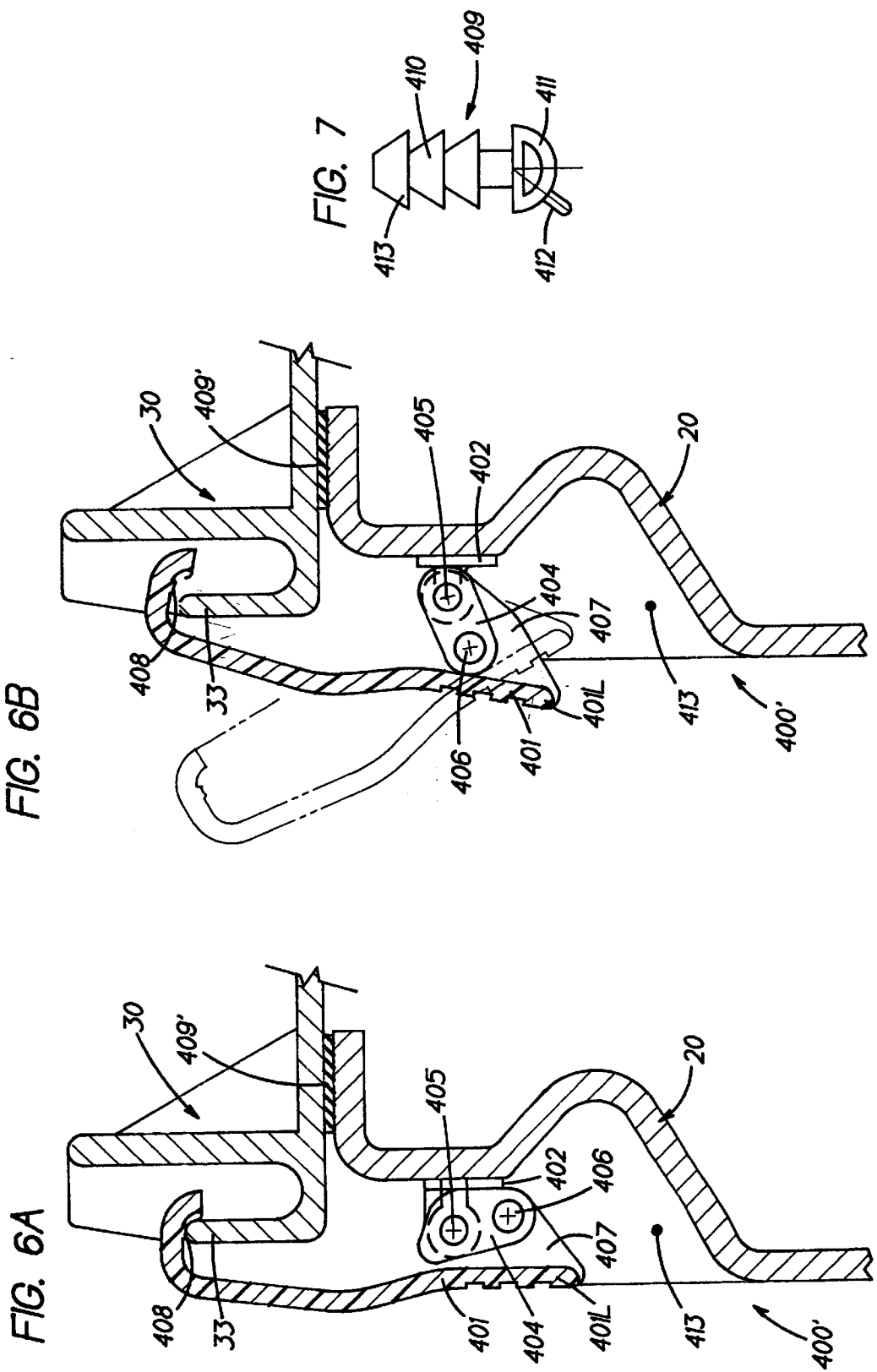

VACUUM CLEANER

This is a request for filing a continuation application under 37 CFR §1.53(b), of pending prior application Ser. No. 09/383,131, filed on Aug. 25, 1999 entitled Vacuum Cleaner which is a continuation of prior application Ser. No. 60/100,742, filed on Sep. 17, 1998, now abandoned.

FIELD OF THE INVENTION

This invention relates generally to vacuum cleaners.

BACKGROUND OF THE INVENTION

Some type of vacuum cleaners include a generally upright tank and a lid which is removably connected to and which generally closes off the upper end of the tank. A vacuum source connected to the lid draws process air, i.e., air carrying dust and debris, through an inlet opening in the tank and then through an exit opening in the lid. A generally cylindrical foam or paper filter with an open upper end in communication with the exit opening in the lid and a closed lower end is typically connected to the underside of the lid and extends downwardly into the canister.

During normal operation of the vacuum cleaner, the vacuum source draws process air into the tank and then through the pleated filter for removal of particulate from the air stream, whereupon the air exits the upper end of the filter and through the exit opening in the lid. With this arrangement, the vacuum source causes a build-up of particulate on the side of the filter. After a certain quantity of contaminant or debris builds up on the outside of the filter, or when the vacuum source is turned off, the build-up may or may not fall from the filter.

A typical prior art solution has been to cover the filter with a pre-filter bag. This bag is made of tightly woven fibers in order to stop dust from entering the filter. When the vacuum is turned on, the air flow through the filter pulls the bag into contact with the filter. When the vacuum is turned off, the bag returns to its original shape, allowing dirt to fall off the bag. While this solution has been used with vacuums that collect dry materials, it is problematic to use with vacuums used for collecting wet materials because the suction would pull water into the bag. Because of the bag construction, the water drains from the bag very slowly.

SUMMARY OF THE INVENTION

In accordance with the present invention, an improved vacuum cleaner is employed. The vacuum cleaner comprises a tank assembly having an open end, a cap assembly removably connected to and generally closing off the open end, an inlet assembly disposed on one of the tank and cap assemblies, an exit opening disposed on one of the tank and cap assemblies, a vacuum source connected to one of the tank and cap assemblies for drawing process air through the inlet assembly, a filter assembly disposed between the inlet assembly and the exit opening, the filter assembly comprising a filter, and a filter bag assembly covering at least part of the filter, wherein the filter bag assembly comprises a filter bag and a drain tube connected to the filter bag. Preferably, the drain tube is integrally built into the filter bag.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 6 illustrates the operation of a latch mechanism similar to the latch mechanism of FIG. 4, where FIG. 6A illustrates a locked latch mechanism and FIG. 6B illustrates an unlocked latch mechanism;

FIG. 7 is a cross-sectional view of a gasket preferably used in the vacuum cleaner of FIG. 1;

FIG. 14 illustrates the operation of the filter assembly of FIG. 13, where

DETAILED DESCRIPTION

Figure 1:
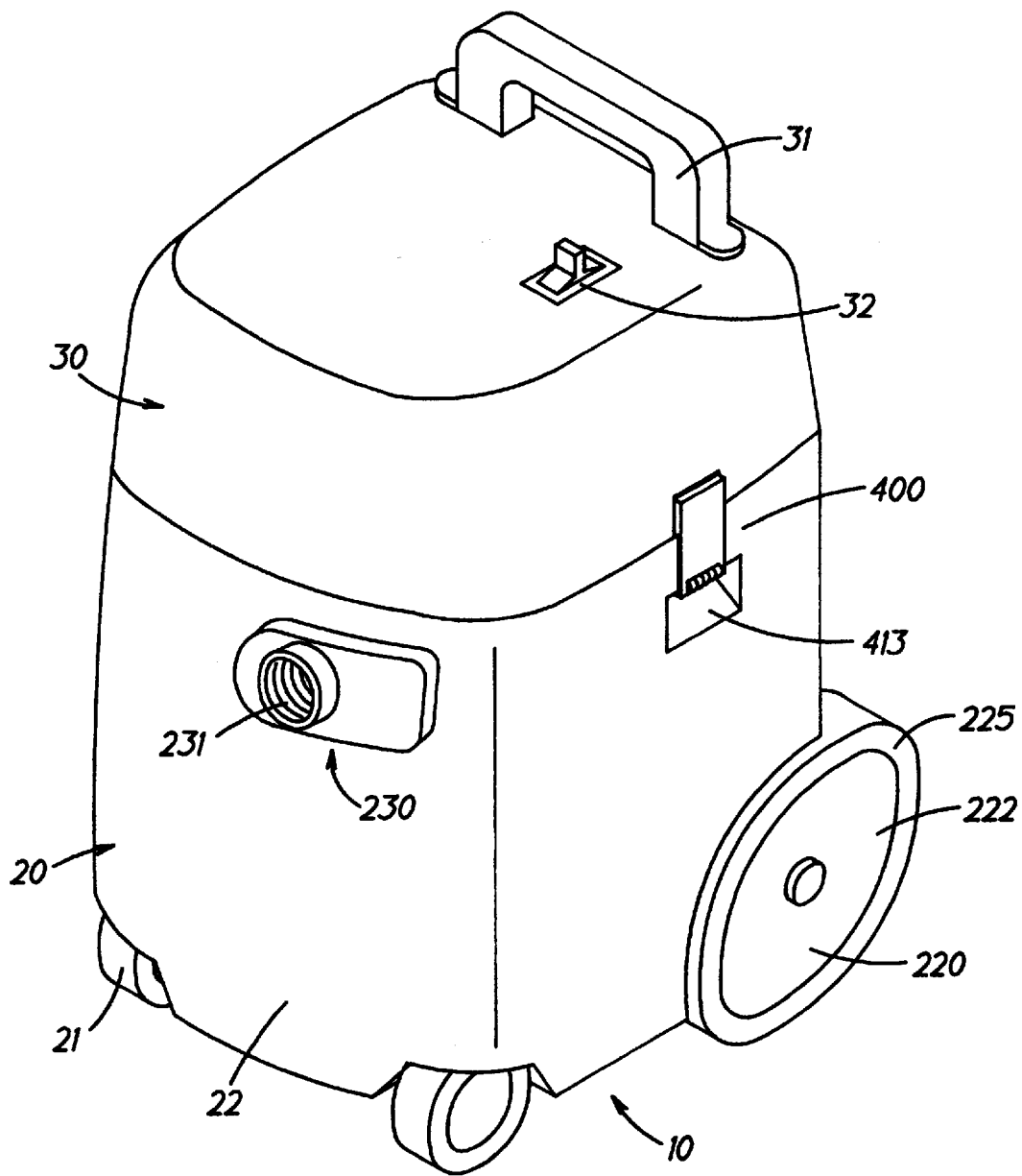
FIG. 1 is a perspective view of the vacuum cleaner according to the present invention.

The invention is now described with reference to the accompanying figures, wherein like numerals designate like parts. Referring to FIG. 1, a vacuum cleaner apparatus 10 preferably comprises a generally upright tank assembly 20, and a cap assembly 30 which is removably connected to and which generally closes off the upper end of the tank assembly 20.

Tank assembly 20 includes a tank 22, which is preferably made of blow-molded polyethylene. Tank assembly 20 may include an inlet assembly 230. Inlet assembly 230 preferably has an opening 231 through which process air, i.e., air carrying dust and debris, travels. Persons skilled in the art will recognize that inlet assembly 230 may be disposed on cap assembly 30 instead. The inlet assembly 230 will be discussed in further detail below.

A motor assembly (70 in FIGS. 16–20) may be connected to and/or contained within the cap assembly 30 for drawing process air through the inlet assembly 230 and then through an exit duct (54 in FIGS. 16–20) in the cap assembly 30. Further details on these elements will be found below. Persons skilled in the art should also recognize that motor assembly 70 may be disposed in tank assembly 20.

Cap assembly 30 may also carry switch 32 for turning the vacuum cleaner 10 on and off.

Preferably, tank assembly 20 comprises wheels for facilitating movement of the vacuum cleaner 10. Such wheels may include typical roller wheels 21, which may pivot about an axis substantially perpendicular to the axis of rotation of the wheels. Allowing wheels 21 to rotate about two respective axis facilitates the maneuvering of vacuum cleaner 10 during movement.

Figure 3:
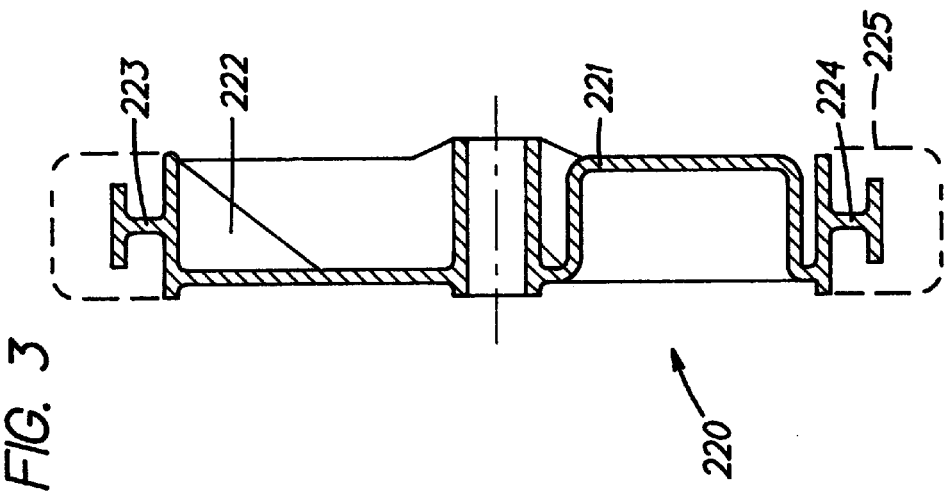
FIG. 3 is a cross-sectional view of the wheel of FIG. 2 along line III—III.
Figure 2:
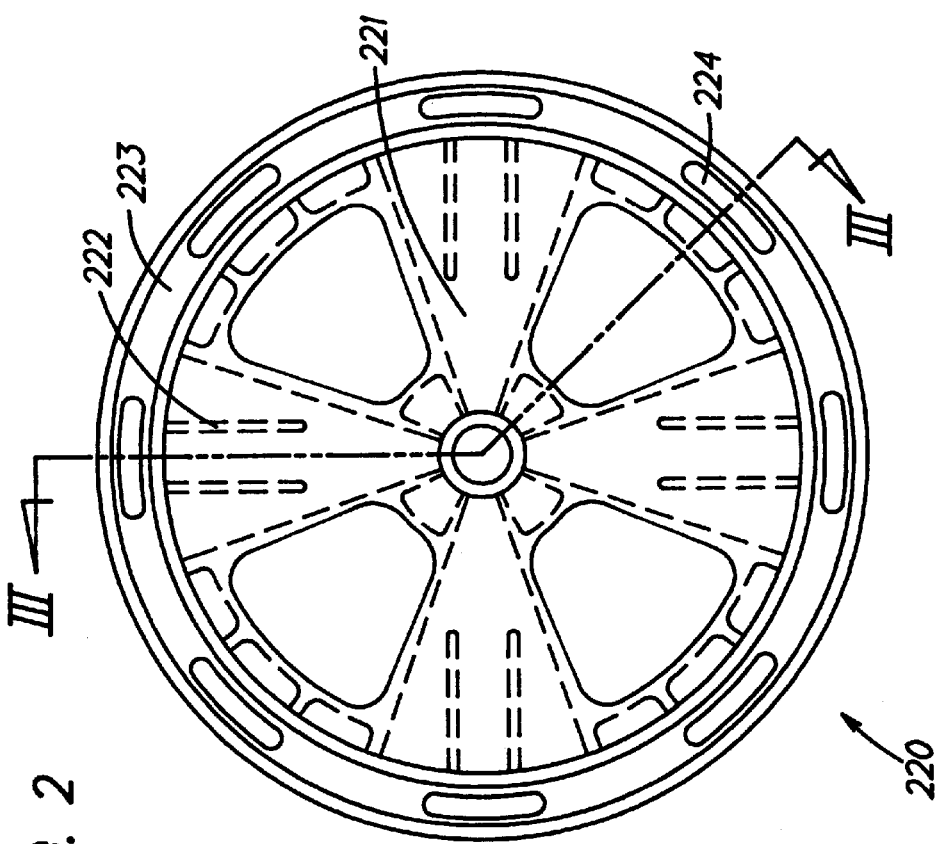
FIG. 2 is a side view of a wheel preferably used in the vacuum cleaner of FIG. 1.
Figure 4:
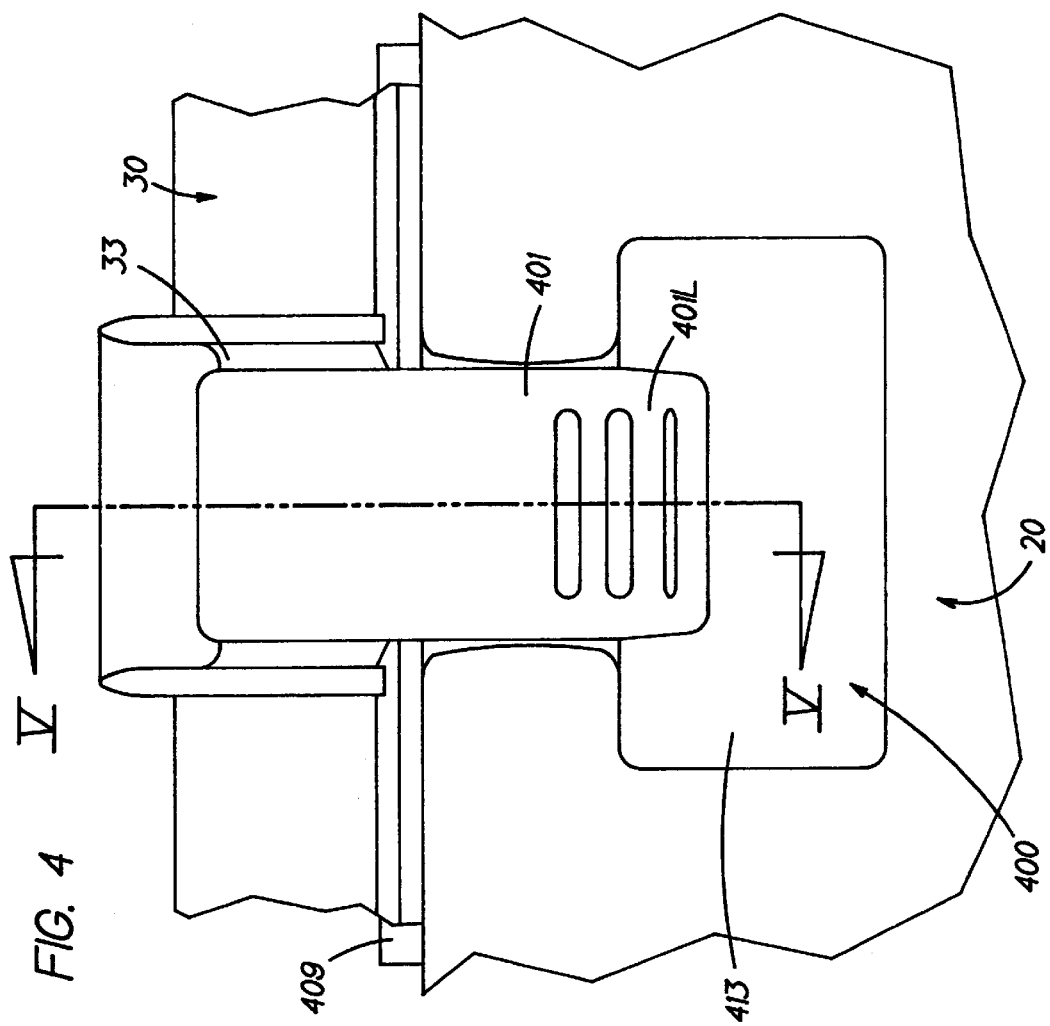
FIG. 4 is a side view of a latch mechanism preferably used in the vacuum cleaner of FIG. 1.

Tank assembly 20 may also comprise wheel assemblies 220. Preferably tank assembly 20 carries at least two wheel assemblies 220. Referring to FIGS. 1–3, a wheel assembly 220 may include a hub frame 221, which may be made of plastic, preferably talc-filled polypropylene. Hub frame 221 may include ribs 222 for strength and/or aesthetic design. Hub frame 221 may also include a rim 223 and openings 224 disposed throughout the rim 223. Preferably, the rim 223 has a generally T-shaped cross-section.

Tire 225 may be disposed on rim 223. The tire 225 is preferably made of a thermoplastic elastomer compound sold under the tradename SANTOPRENE by Advanced Elastomer Systems L.P., Akron, Ohio.

Each wheel assembly 220 may be formed in a two-step injection molding, or overmolding, process. Hub frame 221 is formed in a first step by injecting the plastic into a mold. The hub frame 221 may then be placed as an insert in a second mold. Tire 225 is then molded around the hub frame 221. The tire 225 may be mechanically interlocked to the hub frame 221 by the T-shaped rim 223 and/or by the openings 224 in the rim 223.

Figure 12:
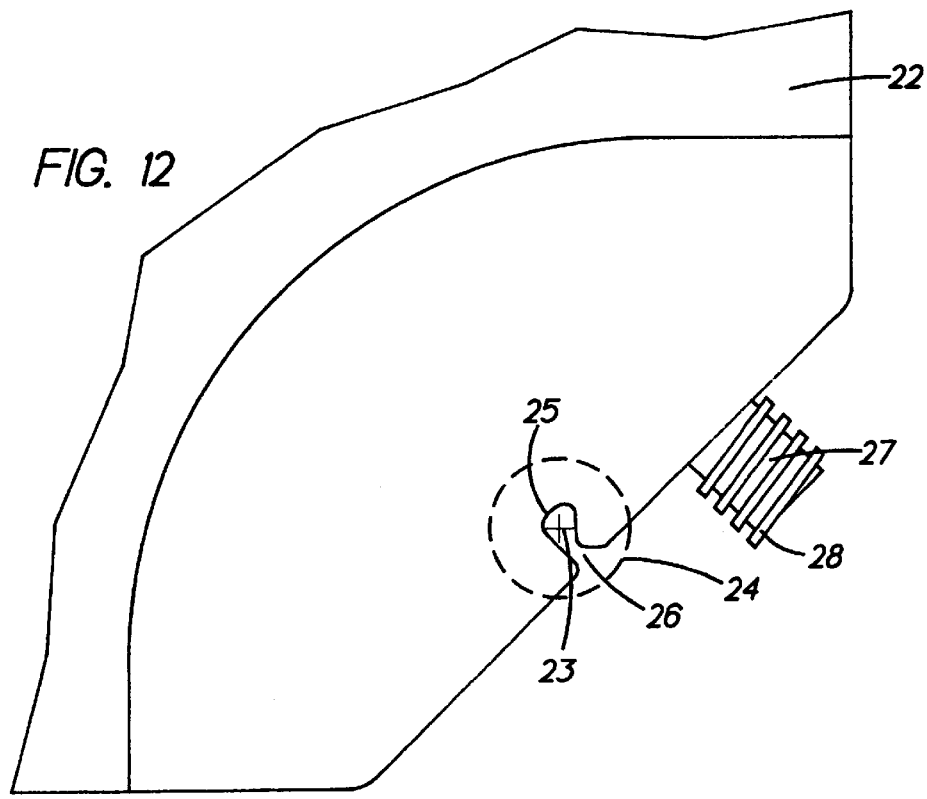
FIG. 12 is a partial right view of the vacuum cleaner of FIG. 1.
Figure 11:
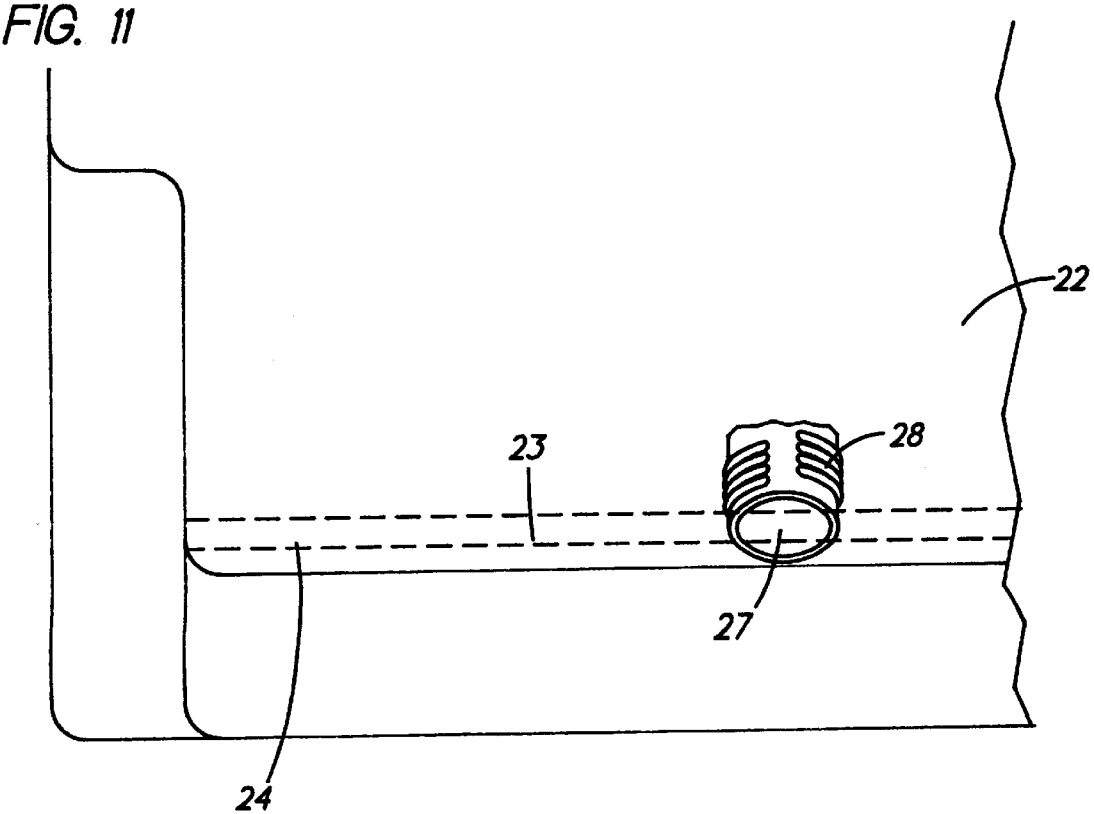
FIG. 11 is a partial rear view of the vacuum cleaner of FIG. 1.

The wheel assemblies 220 may be connected via an axle (not shown). Referring to FIGS. 11–12, tank 22 may have an axle channel 23 formed therein, preferably spanning the entire width of tank 22. Tank 22 may also have at least two molded axle sockets 24 preferably located near the ends of axle channel 23. Preferably axle channel 23 and/or axle sockets 24 are integrally formed in tank 22.

The axle socket 24 may have a mouth 26 having an aperture which is smaller than the diameter of the axle. Preferably mouth 26 and/or axle socket 24 are resilient, so that the axle can be forced or snap-fitted through the mouth 26 and is retained in the socket 24. Preferably mouth 26 retains the axle in socket 24.

Preferably axle socket 24 and/or axle channel 23 have an upper wall 25. When the axle is in place, it contacts upper wall 25 to strengthen and distribute the load in the connection between the tank 22 and the axle.

Because the vacuum cleaner 10 may be used for vacuuming both liquid and dry materials, it is advantageous to provide a drain tube 27 in the tank assembly 20. Referring to FIGS. 11–12, the drain tube 27 is preferably molded integrally with the tank 22. The drain tube 27 may extend from a lower wall of the tank 22. Preferably drain tube 27 is molded with at least one thread 28. This allows the operator to open and/or close the drain tube 27 by screwing a cap closure onto and off the thread 28. Persons skilled in the art will recognize other means to open and/or close the drain tube 27.

Referring to FIGS. 1 and 8–10, the inlet assembly 230 may include a body 233 defining inlet opening 231. Inlet assembly 230 is preferably offset from the vertical lengthwise center plane 232 of the tank assembly 20. The offset inlet assembly 230 thus directs incoming dirt and fluid away from the filter assembly 300 and provides unique styling.

Figure 9:
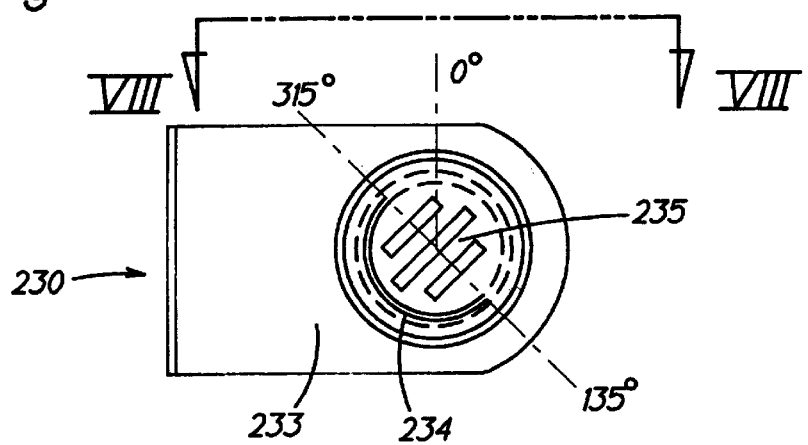
FIG. 9 is a rear view of the inlet of FIG. 8 along line IX—IX.
Figure 10:
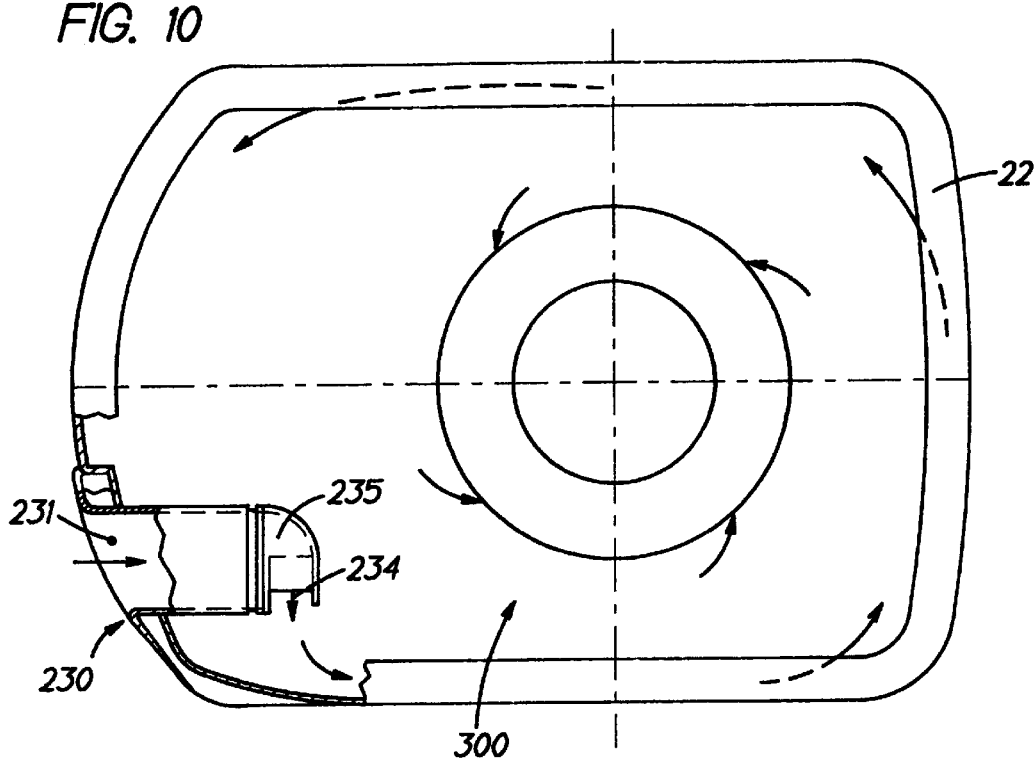
FIG. 10 is a schematic drawing of the air flow within the vacuum cleaner of FIG. 1.

Inlet assembly 230 may also include an end cap 235 connected to the body 233. End cap 235 has an outlet opening 234 for allowing the incoming dirt and fluid to exit from inlet assembly 230. End cap 235 may be shaped so that the outlet opening 234 is located between the angles of 135° and 315°, where zero degrees is preferably at the twelve-o'clock position, as shown in FIG. 9. As a result, the incoming air is directed downwardly toward the adjacent wall of the tank 22. The incoming air then preferably spirals around the tank 22 until it reaches filter assembly 300, as shown in FIG. 10.

As mentioned above, a cap assembly 30 is removably connected to and which generally closes off the upper end of the tank assembly 20. Referring to FIGS. 1 and 4–6, a latch assembly 400 may be used to removably connect cap assembly 30 and tank assembly 20.

The latch assembly 400 preferably has an overcenter mechanism, but persons skilled in the art will recognize that other simpler mechanisms may be used for connecting the tank and cap assemblies. Accordingly, the latch assembly 400 may comprise a latch body 401 having at least one ear 407. Preferably two ears 407, each connected to a respective side of the latch body 401, are used. A pivot shaft 406 is carried by the ear(s) 407.

A pivot link 404 is pivotally connected to the pivot shaft 406. Pivot link 404 is also pivotally connected to shaft 405, which is in turn pivotally connected to base 402. Preferably the axis of shaft 405 and pivot shaft 406 are substantially parallel. Base 402 may be connected to tank assembly 20. Preferably, base 402 is fixedly attached thereto by a rivet 403.

Because of this construction, the latch body 401 can be pivoted relative to the base 402. The lower end 401L of the latch body 401 can be pivoted upwards and outward relative to the base 402 (and thus relative to tank assembly 20) to permit a hook 408 on the upper end of the latch body 401 to be hooked over a latch keeper wall 33 on cap assembly 30, as shown in FIG. 6B. The lower end 401L can then be pivoted inwardly and downwardly to the location shown in FIGS. 5 and 6A.

The latch body 401, a main wall of cap assembly 30 and a main wall of tank assembly 20 may be disposed relative to each other so that they are generally coplanar. As a result the latch body 401 would be generally flush with the main walls of the cap and tank assemblies in the latched position. Persons skilled in the art will recognize that it may be expedient to provide a pocket 413 to allow the operator to move the latch body 401. The pocket 413 may also be used as a hand hold while dumping the contents of tank assembly 20.

When the latch body 401 is pivoted into the latched position, the hook 408 pulls the cap assembly 30 tightly against the tank assembly 20. A gasket 409 disposed between the tank and cap assemblies is thus compressed, sealing the contact between the two assemblies so that air cannot escape.

In the latched position, the pivot shaft 406 is preferably shifted overcenter relative to the shaft 405, i.e., inwardly of the shaft 405 and towards tank assembly 20. The overcenter position of the pivot shaft 406 permits the latch body 401 to be retained stably latched under the bias applied by the gasket against cap assembly 30, and thus against latch keeper wall 33 and hook 408.

To unlatch, the lower end 401L latch is again pivoted outwardly and upwardly until the hook 408 can be pivoted outwardly from the latch keeper wall 33.

Persons skilled in the art should recognize that the latch assembly components could be disposed either the tank assembly 20 or cap assembly 30. For example, base 402 can be disposed on cap assembly 30. Similarly, hook 408 may be connectable to a latch keeper wall 33 disposed on tank assembly 20, in the same manner as discussed above.

Figure 5:
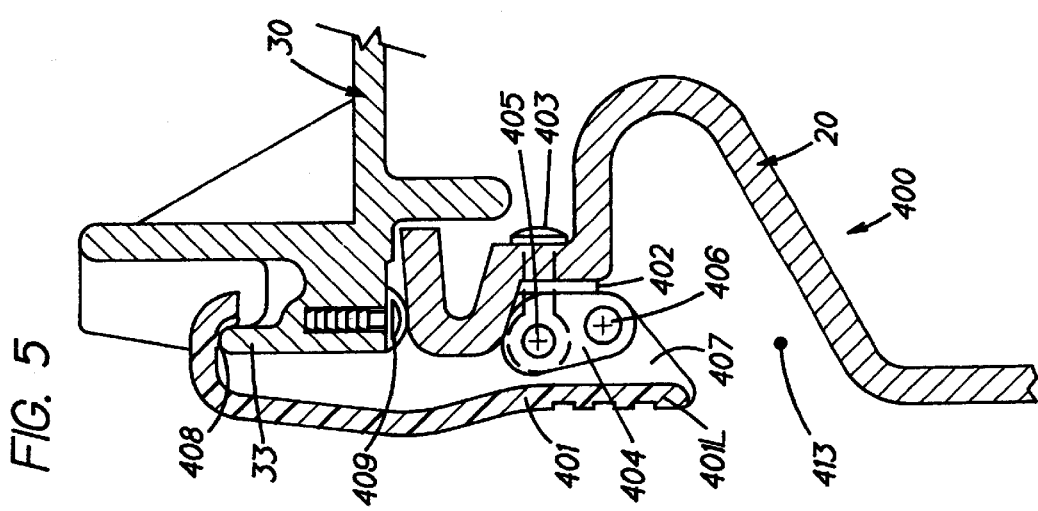
FIG. 5 is a cross-sectional view of the latch mechanism of FIG. 4 along line V—V.
Figure 8:
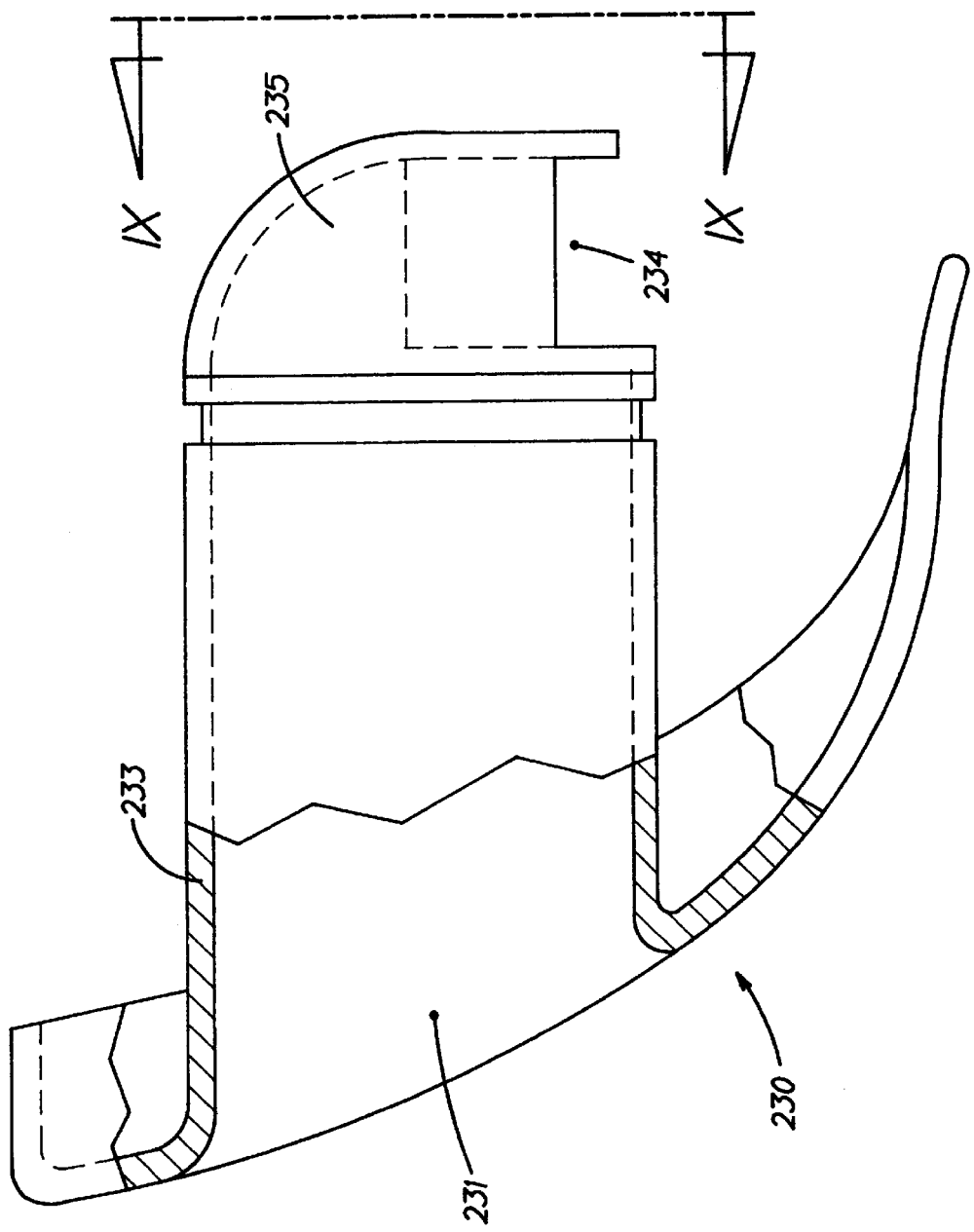
FIG. 8 is a top plan view of an inlet preferably used in the vacuum cleaner of FIG. 1.

As mentioned above, the gasket is disposed between the tank and cap assemblies. Such gasket could be generally flat shaped, such as gasket 409' in FIG. 6, or elongated as gasket 409 in FIG. 5. Referring to FIGS. 5 and 7, such elongated gasket 409 may have a half-cylindrical main body 411 and an elongated stem 410 connected thereto. Stem 410 may also include at least one frustroconical segment for fastening. The stem 410 may be disposed in a channel in the cap assembly 30, as shown in FIG. 5. Preferably, the width of the channel is smaller than the outer diameter of the stem 410. The stem 410 is thus in compression and resists removal from the channel. Preferably gasket 409 is made of extruded neoprene rubber.

Body 411 may have an elongated lip 412 extending therefrom. Preferably lip 412 extends radially from body 411 at an angle of about 45° from the centerline of the body 411. Lip 412 improves the seal with tank assembly 20.

Figure 13:
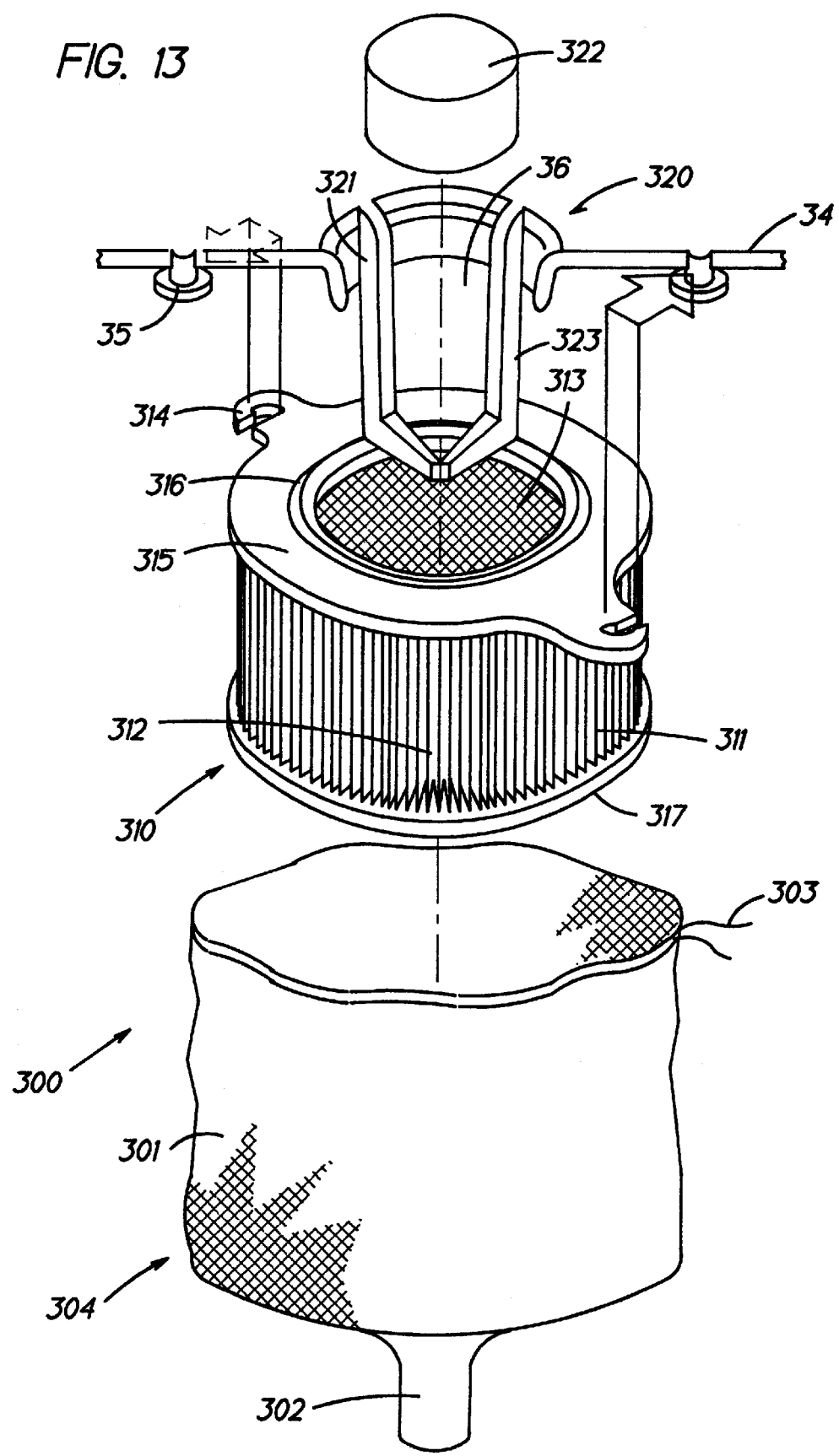
FIG. 13 is an exploded view of a filter assembly preferably used in the vacuum cleaner of FIG. 1.

A filter assembly 300 is preferably disposed between the cap assembly 30 and the tank assembly 20 to filter the process air. Referring to FIGS. 13–14, the filter assembly 300 may be connected to a bottom wall 34 of cap assembly 30. The filter assembly 300 may also extend downwardly into the tank assembly 20. Persons skilled in the art should however recognize that the filter assembly 300 may be disposed on tank assembly 20 and still perform the same function.

Preferably filter assembly 300 comprises a filter cartridge assembly 310. The filter cartridge assembly 310 may include a filter 311. Preferably filter 311 is generally cylindrical and made of foam, paper or polyester. The foam, paper or polyester may be folded into pleats 312 to increase filtering area.

Filter 311 may be formed with an open upper end in communication with an exit opening 36 formed in the bottom wall 34. Filter 311 may also be formed with a closed lower end.

Filter cartridge assembly 310 may also include an inner expanded metal core 313 supporting filter 311 to resist compressive forces during operation. Metal core 313 may also have a closed bottom (not shown) to provide greater filter integrity. The metal core 313 may be constructed from a sheet of metal that is slit longitudinally and then pulled, i.e., expanded, to form the openings therein.

Filter cartridge assembly 310 may also include an upper ring 315 for supporting the metal core 313 and/or filter 311. Preferably the upper ring 315 is made of rubber or plastic. An annular flange 316 may be disposed on the cartridge assembly 310, preferably on ring 315, to form a seal against the bottom wall 34. Preferably flange 316 extends upwardly from the ring 315.

Filter cartridge assembly 310 may also include a bottom 317 supporting the metal core 313 and/or filter 311. Preferably the bottom 317 is made of rubber or plastic. Preferably metal core 313 and/or filter 311 extend between upper ring 315 and bottom 317.

The filter cartridge assembly 310 may be attached to the bottom wall 34 via posts 35 and hooks 314. Preferably posts 35 are disposed on wall 34 while hooks 314 are disposed on the cartridge assembly 310 (or ring 315), but persons skilled in the art should recognize that the reverse arrangement would also work for the intended purpose. Cartridge assembly 310 may then be installed by rotating the cartridge assembly 310 about its axis and engaging hooks 314 with posts 35, as shown in FIG. 13. Persons skilled in the art should also recognize that hooks 314 may engage bolts instead of posts 35 and still obtain the same result. Furthermore, persons skilled in the art should recognize that other means for attaching the cartridge assembly 310 to the bottom wall 34 are available. For example, cartridge assembly 410 may be disposed directly on posts 35 and held in place by thumbscrews threadedly engaged to posts 35.

The filter cartridge assembly 310 may be partly covered by a pre-filter assembly 304. Referring to FIGS. 13–14, pre-filter assembly 304 may include a bag 301. Preferably bag 301 covers most, if not all, of filter 311. Bag 301 may be attached to the cartridge assembly 310 via a draw string 303, by an elastic band, and/or by openings letting hooks 314 therethrough. Preferably bag 301 is made of Dacron or other fabric materials. It is also preferable that the fibers constituting the fabric be tightly woven, so as to properly filter dust particles.

Figure 14B:
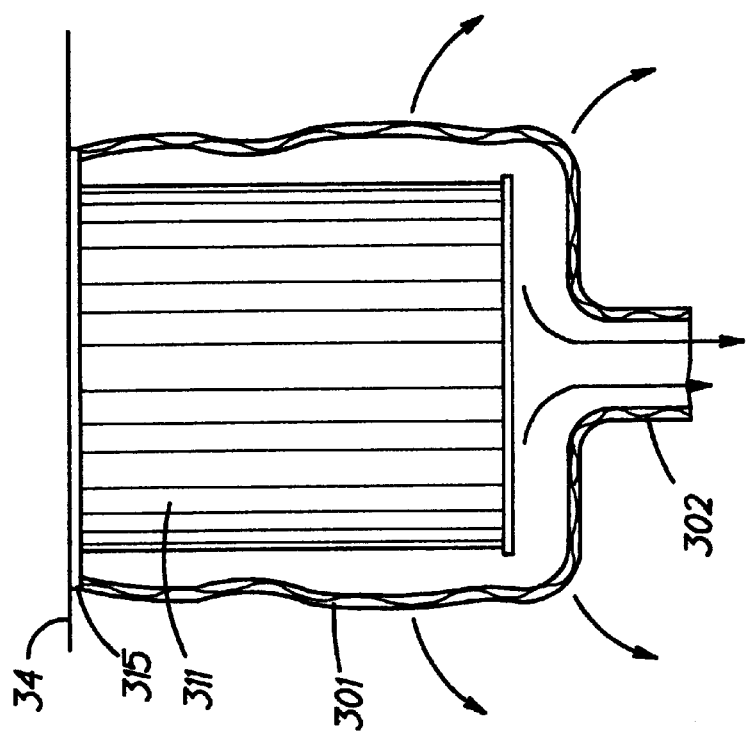
FIG. 14A illustrates the filter assembly during a vacuuming operation and FIG. 14B illustrates the filter assembly after the vacuuming operation has ended.
Figure 14A:
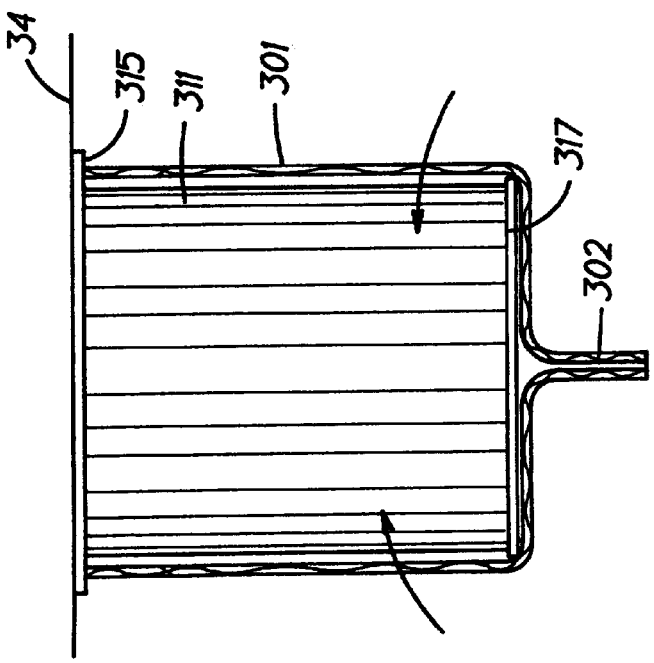

Bag 301 has a drain tube 302. Preferably drain tube 302 is formed integrally with bag 301. The drain tube 302 may extend downwardly from the bottom of the bag 301. Accordingly, when the vacuum is in operation, the air flow pulls the bag 301 into contact with the filter 311, filtering most dust particles. Suction also causes the drain tube 302 to close, as shown in FIG. 14A. When the vacuum is turned off, the bag 301 returns to its original shape, allowing dirt to fall off the bag 301. The drain tube 302 then opens and allows the liquid in the bag 301 to drain, as shown in FIG. 14B.

Persons skilled in the art should recognize that bag 301 may also be provided with non-integral drain tubes made of, for example, plastic, and arranged in such manner that the bag 301 itself blocks the drain tube. Alternatively, the drain tube may include a movable flap that closes itself, and thus blocks the drain tube, during vacuum operation. Persons also skilled in the art will recognize that the blocking function may also be performed by the filter cartridge assembly 310. For example, bottom 317 may solely or jointly contribute towards blocking the drain tube.

The filter assembly 300 may also include a shut-off assembly 320, which will stop the airflow when a water level within tank assembly 20 is reached, and/or when vacuum cleaner 10 is inverted. Shut-off assembly 320 may include a cage 321 (a quarter of which is shown in FIG. 13). Cage 321 may be molded integrally as part of bottom wall 34. Alternatively, cage 321 may be part of the filter cartridge assembly 310 or placed therewithin. Preferably cage 321 consists of at least 3 ribs 323.

A float 322 is placed within cage 321. Float 322 is preferably made of rubber or plastic and may be shaped as a sphere, an inverted cup (i.e., with the open end facing downwardly) or any other appropriate shape. Persons skilled in the art will recognize that a cup-shaped float is easier to mold than a spherical float. Float 322 will move along and/or be guided by cage 321 as the water level in tank assembly 22 increases, until it closes exit opening 36, shutting off the airflow. Foam rubber, or other similar materials, on float 322 and/or walls defining exit opening 36 may be used to enhance sealing of exit opening 36.

Persons skilled in the art will recognize that the float 322 could be placed within filter cartridge assembly 321 without a cage, with or without the metal core 313 functioning as cage 322.

Referring now to FIGS. 15–20, cap assembly 30 may include a cover 37, a midlevel partition 38 and bottom wall 34. Preferably the cover 37, the partition 38 and the bottom wall 34 are made of molded plastic.

The cover 37, partition 38 and bottom wall 34 are preferably supported in a spaced relationship to each other by a plurality of spaced bushings and/or walls. For example, wall 39 of partition 38 contacts cover 37 and maintains the cover 37 and partition 38 in a determined spaced relationship. Similarly, partition 38 may protrude forming walls 40, which may also contact cover 37 to maintain cover 37 and partition 38 in a determined spaced relationship. Preferably walls 39 and/or 40 are also formed in such manner so as to assist in directing the different airflows, as explained fuller in detail below.

Bottom wall 34 may also protrude forming walls 41, which may also contact partition 38 to maintain partition 38 and bottom wall 34 in a determined spaced relationship. Walls 41 may have a hole 41H for receiving a bolt and nut combination (not shown) contacting both bottom wall 34 and partition 38 for securely holding the two layers in place.

Similarly, partition 38 may have a bushing projection 43 which contacts a bushing projection 42 of bottom wall 34. A bolt 44 may threadedly hold the two bushing projections 42, 43 together in place, maintaining partition 38 and bottom wall 34 in the desired spaced relationship. Similar bushings may be disposed between cover 37 and partition 38, and between partition 38 and bottom wall 34 as necessary or desired.

Figure 17:
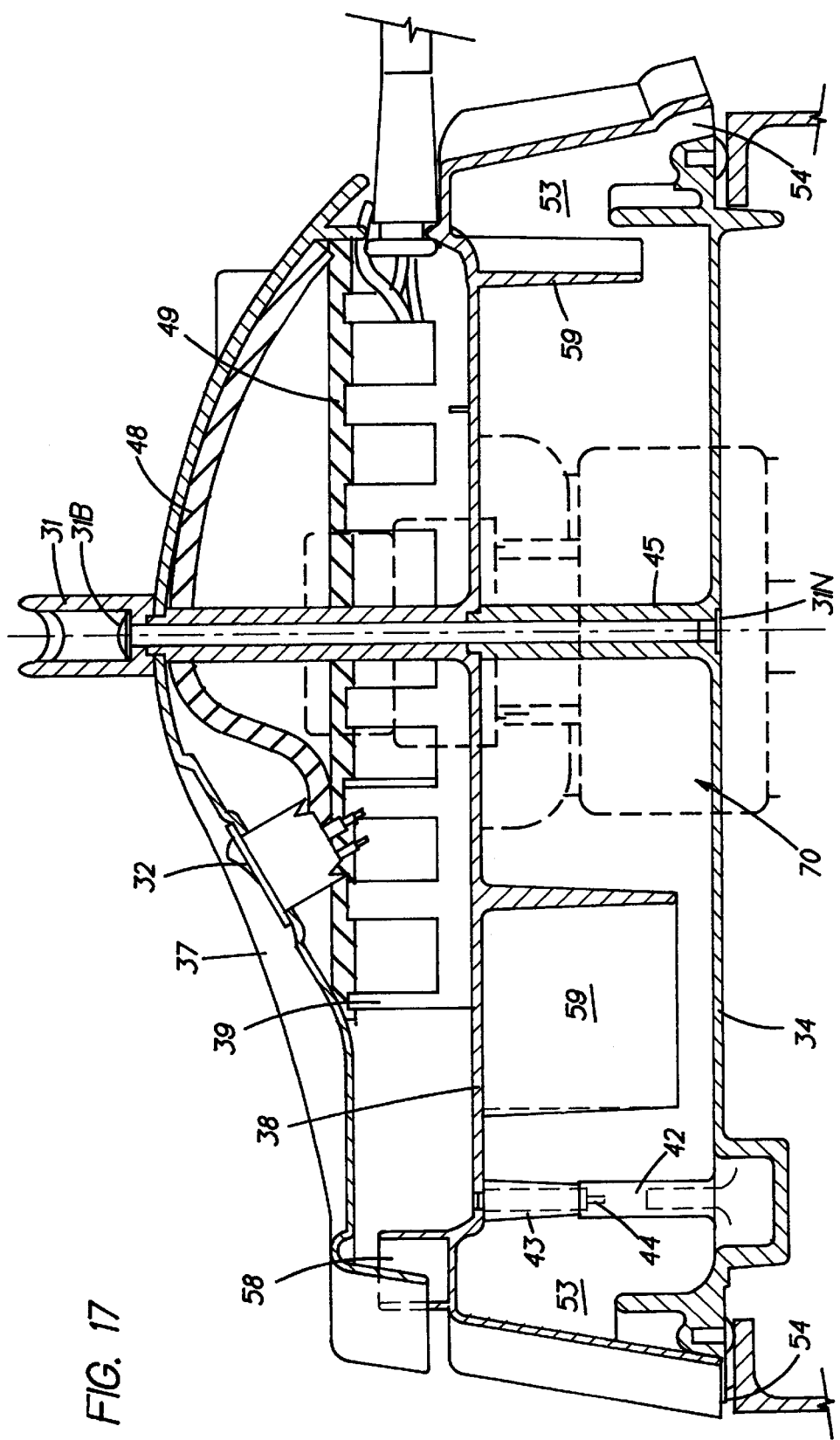
FIG. 17 is a cross-sectional view of the cap assembly of FIG. 15 along line XVII—XVII.

Preferably bottom wall 34 has a bushing projection 45 contacting partition 38. Bushing projection 45 is preferably substantially cylindrical and hollow. Similarly, partition 38 may have a bushing projection 46 contacting cover 37. Bushing projection 46 is preferably substantially cylindrical and hollow. Preferably bushing projections 45, 46 are substantially coaxial and adapted to receive bolt 31B and/or nut 31N. By securing bolt 31B and nut 31N as shown in FIG. 17, cover 37, partition 38 and bottom wall 34 are securely held in place and in the desired spaced relationship. Persons skilled in the art should recognize that similar bushing projections may be disposed between the cover 37 and partition 38, and between partition 38 and bottom wall 34 to perform the same function.

Motor assembly 70 may be disposed within cap assembly 30 for drawing the process air into tank assembly 20 and filter assembly 300. Motor assembly may include a motor 71 at least partly enclosed by a motor housing 72. Preferably motor housing 72 is supported by partition 38. Motor 71 may have a drive shaft 73 for driving fan 74.

Fan 74 may be at least partly enclosed by fan housing 75, which may be supported by bottom wall 34 and/or partition 38. Fan housing 74 preferably has an inlet opening 78 that communicates with exit opening 36. Furthermore, fan housing 74 may have at least one exit opening 76 for allowing process air to exit from fan housing 74.

Preferably, resilient layers 79, 80 are disposed between the fan housing 74 and partition 38, and between fan housing 74 and bottom wall 34, respectively. Layers 79, 80 may be made of rubber, plastic or foam to decrease the vibrations transmitted from the fan housing 74 to the partition 38 and bottom wall 34 and/or to provide a seal between the fan housing 74, the partition 38 and bottom wall 34. Accordingly, it is preferable that layers 79, 80 be made of high-density, or closed small-porosity, foam rubber material.

Motor 71 may also drive a cooling air fan 77, for drawing air into the motor housing 72 and cooling motor 71.

Ducting layers 48, 49 may be disposed between cover 37 and partition 38 to assist directing the cooling air drawn by fan 77. In other words, cover 37, partition 38, and ducting layers 48, 49 define the cooling air path. Preferably ducting layers 48, 49 are made of a pliant material that is substantially impenetrable by air, such as rubber or a high-density, or closed small-porosity, foam rubber material. Ducting layers 48, 49 may be fixedly attached to cover 37 and/or partition 38 via glue, rivets, tabs, etc.

The cooling air may enter via an inlet duct 50 formed within cap assembly 50, preferably by partition 38 and/or cover 37. Ducting layers 48, 49 preferably direct the cooling air towards fan 77. Cooling air then moves past motor 71 and exits from motor housing 72. Cooling air may then pass through an inner annular notched wall 51 preferably surrounding the motor housing 72 and supporting ducting layer 49. Cooling air may then pass through intermediate annular notched wall 39. Finally cooling air may curve around an outer solid wall 58 surrounding the intermediate wall 39 and possibly forming an expansion chamber 52. Preferably expansion chamber 52 may slow the speed of the cooling air, thus reducing noise.

Figure 20:
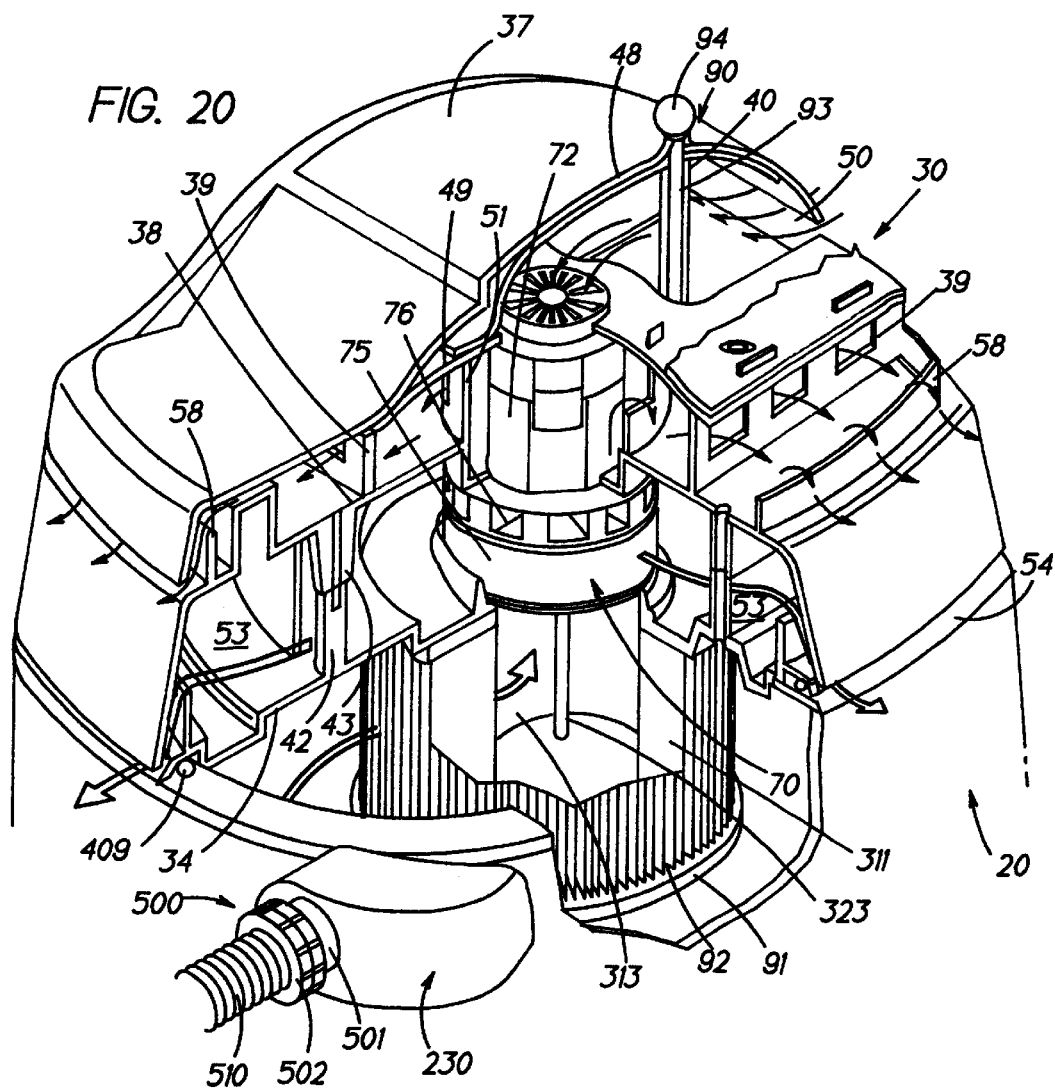
FIG. 20 is a partial cross-sectional view of the cap assembly of FIG. 15.

As shown in FIG. 20, intermediate wall 39 and solid wall 58 may be disposed on three sides of the cap assembly 30, whereas inlet duct 50 is only located at the rear of cap assembly 30. Accordingly, cooling air preferably enters cap assembly 30 from a first side, whereas it exits cap assembly 30 from all sides but the first side.

As mentioned above, the filtered process air preferably enters fan housing 74 via inlet opening 78 and exits fan housing 74 via exit opening 76. Process air then exits cap assembly 30 via a pathway and out an exit duct 54 preferably formed by partition 38 and/or bottom wall 34, as shown in FIG. 20. Preferably exit duct 54 is omnidirectional, thus allowing process air to exit cap assembly 30 in all directions. Persons skilled in the art will recognize that exit duct 54 may be formed in any location within vacuum cleaner 10, including tank assembly 20 and/or cap assembly 30.

Referring to FIGS. 16–20, it is preferable to manipulate the air flow along the process air pathway in order to slow its speed and/or reduce noise. Accordingly, solid walls and/or ducting layers may be disposed to create noise-reduction chambers. For example, an annular expansion chamber 53 may be disposed near the exit duct 54 for slowing the process air speed and reducing noise. Persons skilled in the art will recognize that other shapes for expansion chamber 53 would achieve the same result.

Similarly, solid wall 59 formed by partition 38 and/or bottom wall 34 may be used to create a chamber 60. Preferably wall 59 is a single annular shape surrounding motor assembly 70, and defining an annular chamber 60. Chamber 60 could be adapted to function as an expansion chamber. Alternatively, chamber 60 could act as an acoustic chamber for damping audible signals, and thus reducing noise.

Ducting layers may be disposed between partition 38 and bottom wall 34 to further assist in directing the process air.

Figure 16:
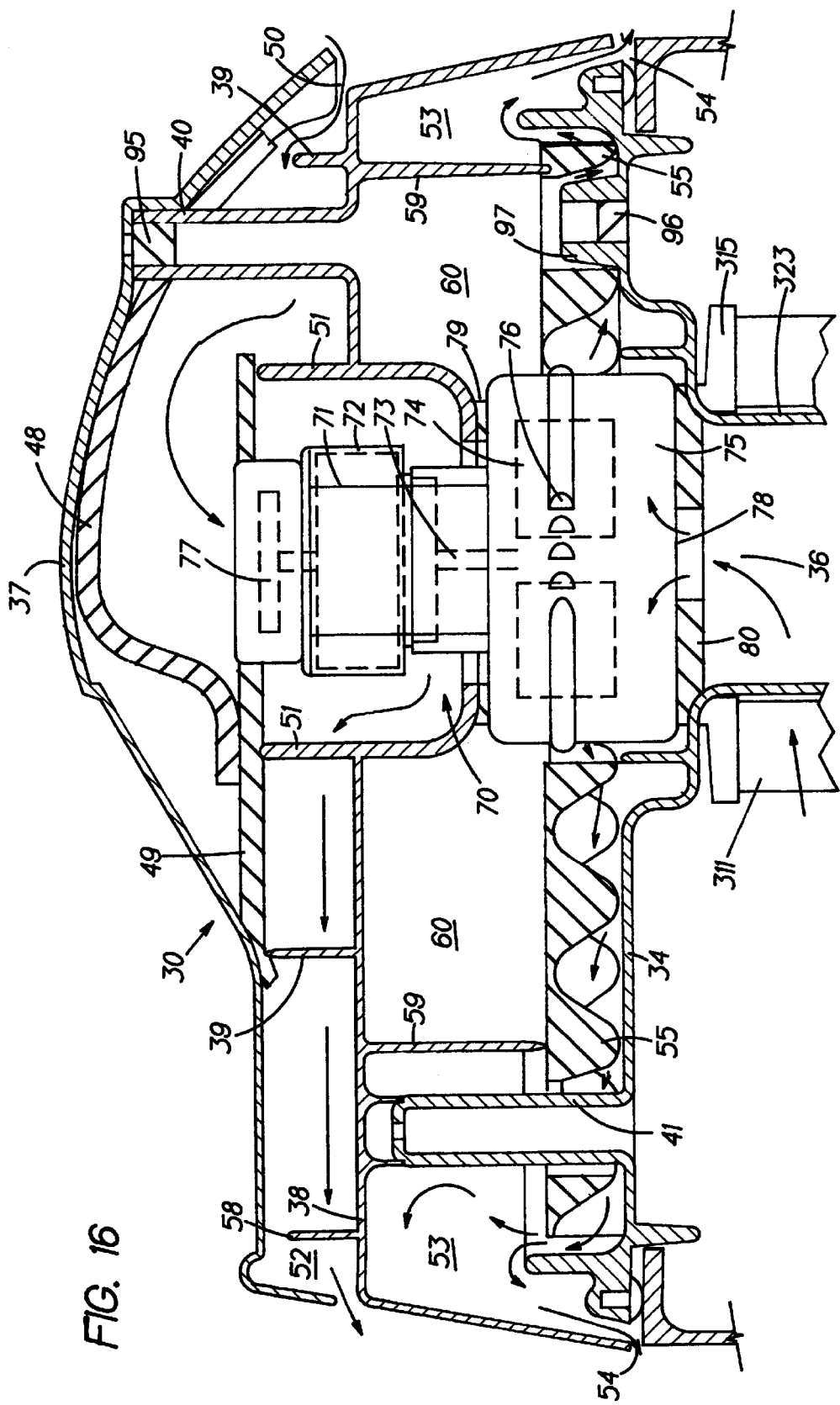
FIG. 16 is a cross-sectional view of a first embodiment of the cap assembly of FIG. 15 along line XVI—XVI.
Figure 18:
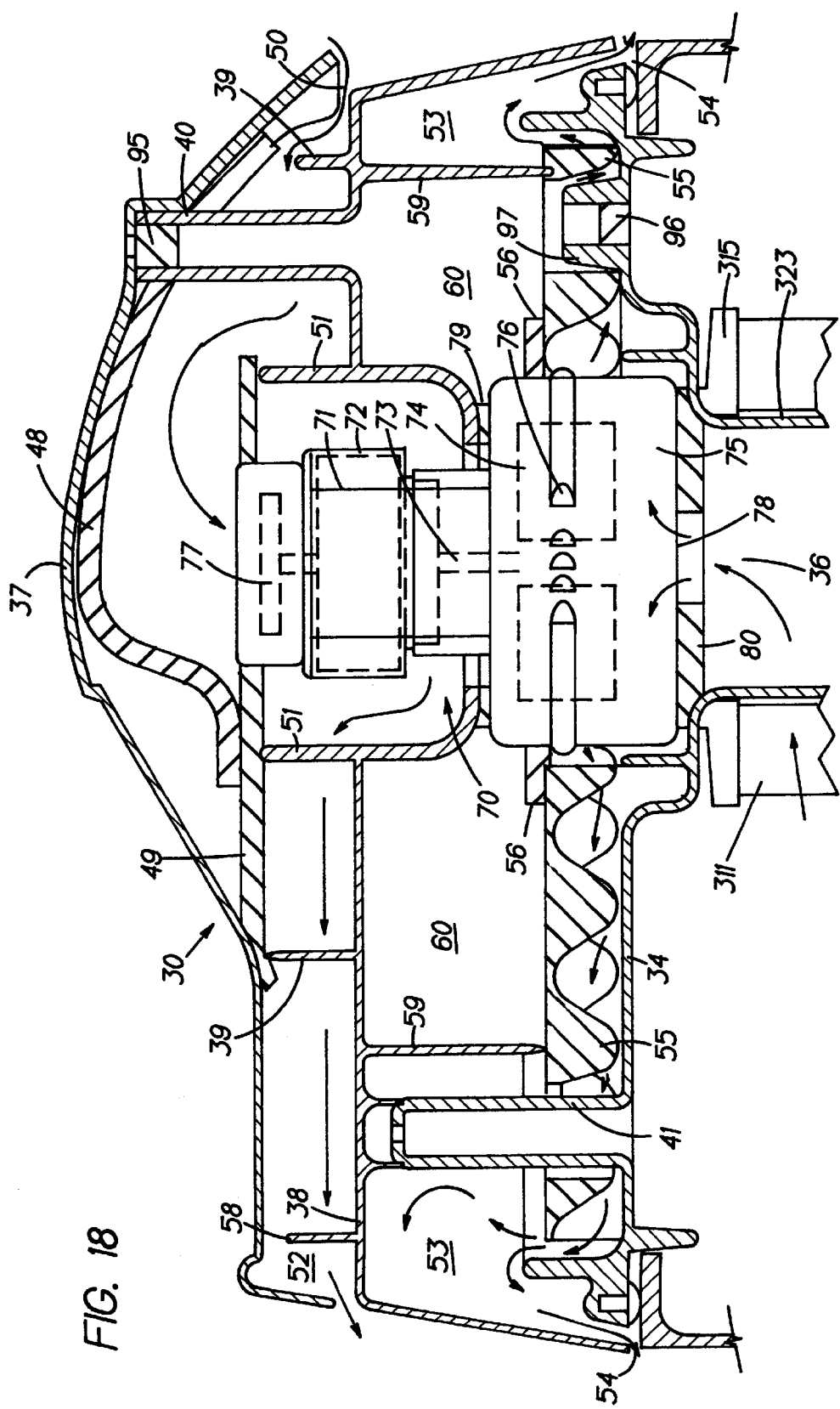
FIG. 18 is a cross-sectional view of a second embodiment of the cap assembly of FIG. 15 along line XVI—XVI.
Figure 19:
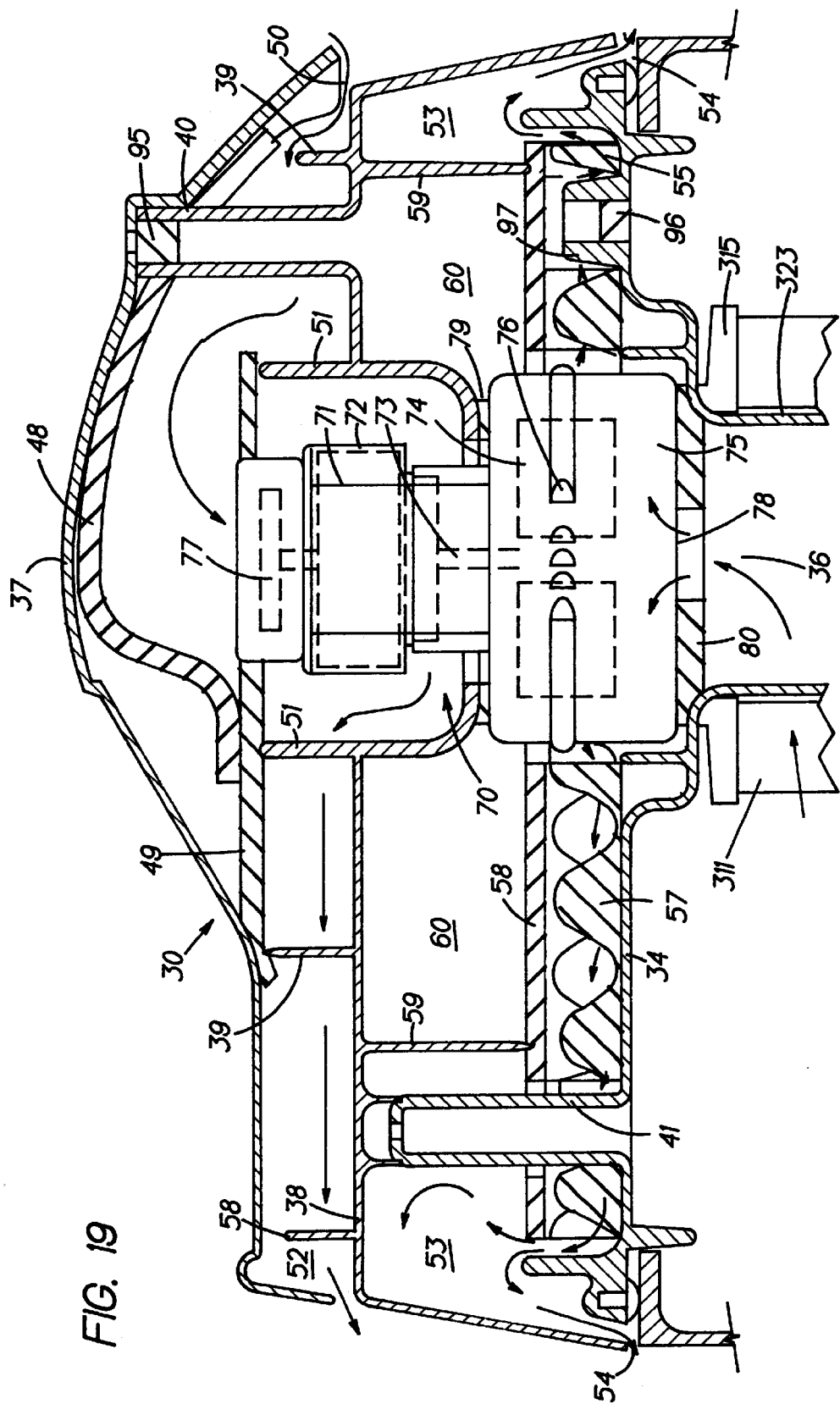
FIG. 19 is a cross-sectional view of a third embodiment of the cap assembly of FIG. 15 along line XVI—XVI.

For example, an inverted egg-carton ducting layer 55 is disposed as shown in FIGS. 16 and 18, for directing air towards chamber 53. Preferably ducting layer 55 is made of a pliant material that is substantially impenetrable by air, such as rubber or a high-density, or closed small-porosity, foam rubber material. Accordingly, the process air would follow a tortuous, twisting path towards chamber 53.

Referring now to FIG. 16, process air exiting fan housing 75 may enter chamber 60. Theoretically, chamber 60 would not act as an expansion chamber once it is properly pressurized. Instead, it could act as an acoustic chamber due to the combination of soft (foam) and hard (walls) surfaces used, thus reducing noise. Persons skilled in the art should recognize that the above is only a theory and should not be interpreted as the manner in which chamber 60 is actually used or actually functions, but rather as a possible mode of operation.

To prevent air from entering chamber 60, it may be preferable to dispose an annular layer 56 between layer 55 and fan housing 75.

Persons skilled in the art should recognize that other ducting layer arrangements may be used for directing process air flow. For example, referring to FIG. 19, ducting layer 57 may be disposed on bottom wall 34. Ducting layer 58 may be disposed on layer 57, creating a path for the process air. Preferably, layer 57 and/or 58 have an egg-carton configuration, forcing air to turn multiple times before reaching chamber 53.

Persons skilled in the art should recognize that the cap assemblies 30 described above have fewer parts and are significantly simpler to assemble than typical prior art vacuums. Persons skilled in the art should also recognize that elements of cap assembly 30, such as ducts, chambers, etc., can be disposed in tank assembly 20 by itself and/or in combination with cap assembly 30.

Referring to FIGS. 16 and 18–20, the cap assembly 30 may also support filter brush assembly 90. Filter brush assembly 90 includes a filter brush 91 which may be moved along filter 311 for cleaning filter 311 and removing dust therefrom. Preferably filter brush 91 has bristles 92 contacting filter 311. Filter brush assembly 90 may include a rod 93 attached to filter brush 91 at one end and to a knob 94 at the other end. Such construction allows the operator to move the filter brush 91 without opening vacuum cleaner 10.

Rod 93 may be slidably received by cap assembly 30. For example, wall 40 may be preferably substantially cylindrical and hollow. Similarly partition 38 and/or bottom wall 34 may have a projection 97 which may be substantially cylindrical and hollow. Preferably wall 40 and projection 97 are substantially coaxial. Rod 93 may be slidably received within wall 40 and projection 97 and enter tank assembly 20.

If the filter brush assembly 90 is not installed, it is preferable to provide plugs 95, 96 (FIG. 16) to dispose within wall 40 and projection 97, respectively. Using plugs 95, 96 avoids any undesired leakage of air from one chamber into the other.

As mentioned above, latch assemblies 400 are used to connect the cap assembly 30 with tank assembly 20. Referring to FIG. 1, each latch assembly 400 is preferably disposed at each corresponding side of vacuum cleaner 10.

Figure 15:
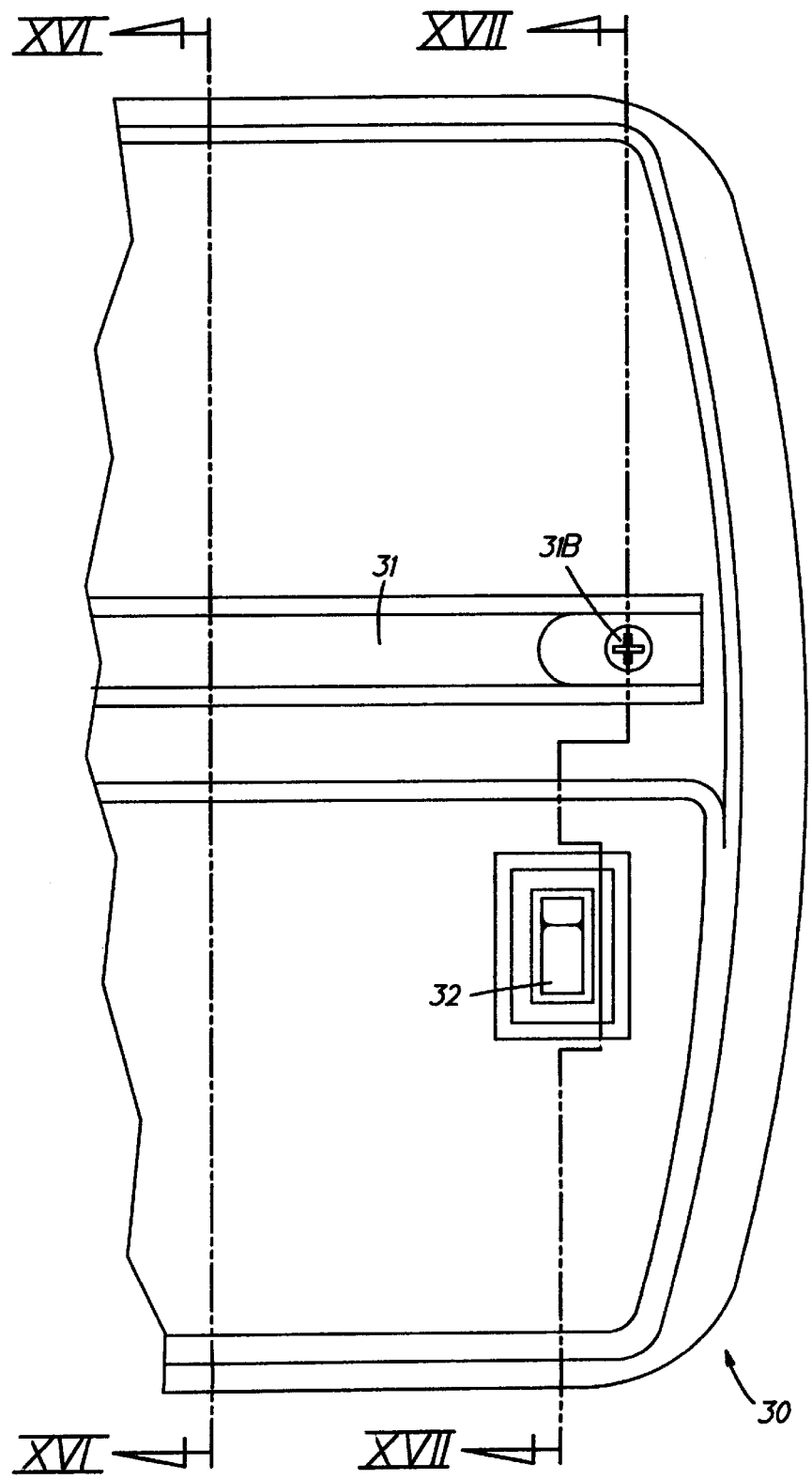
FIG. 15 is a top plan view of a cap assembly preferably used in the vacuum cleaner of FIG. 1.

A handle 31 is preferably fixedly attached to cap assembly 30. Referring to FIGS. 1, 15 and 17, handle 31 may be attached to the cap assembly 30 by a pair of bolts 31B each located adjacent one of the latch assemblies 400 to distribute the pulling force during lifting of vacuum cleaner 10 from cap assembly 30 to tank assembly 20 through the latch assemblies 400. Each bolt 31B preferably extends through the cover 37 and along bushing projections 45, 46 at a location that is adjacent to and slightly inwards and rearward of the latch assembly 400. Each bolt 31B may be threadedly engaged to a nut 31N disposed on or below bottom wall 34. Persons skilled in the art should recognize that nut 31N may be formed integrally within wall 34. With such construction, the bolts 31B and nuts 31N provide structural support for the cap assembly 30 and help transfer the force to the tank assembly 20 through the latch assemblies 400.

Figure 21:
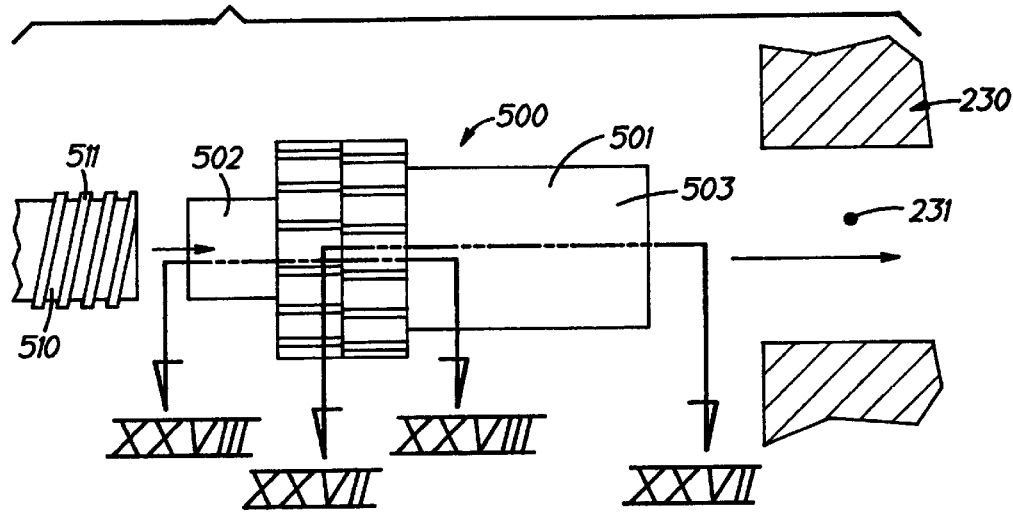
FIG. 21 is a side view of a hose adapter preferably used in the vacuum cleaner of FIG. 1.
Figure 22:
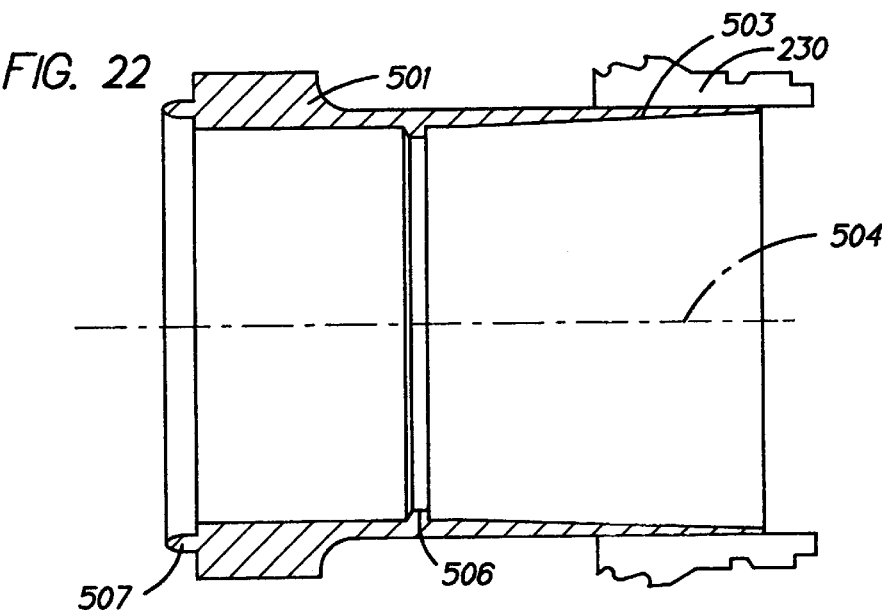
FIG. 22 is a cross-sectional view of the hose adapter of FIG. 21 along line XXII—XXII.
Figure 23:
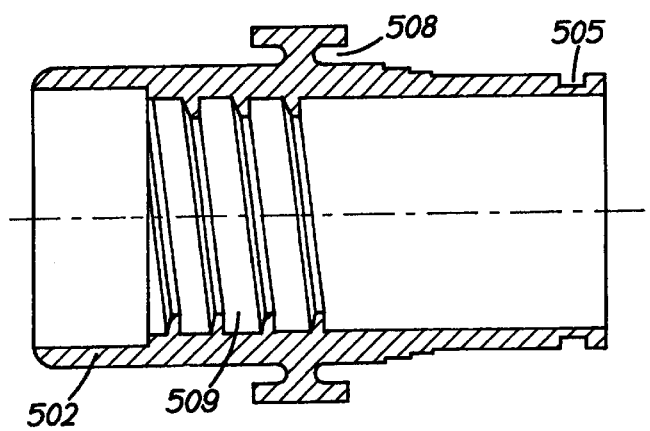
FIG. 23 is a cross-sectional view of the hose adapter of FIG. 21 along line XXIII—XXIII.

Another aspect of the present invention is the hose adapter assembly 500, which is used to connect a vacuum hose 510 to the vacuum cleaner 10. Referring to FIGS. 21–23, the inlet assembly 230 preferably has a tapered inlet opening 231. The adapter assembly 500 may include a male coupling 501, which in turn has an end 503. Preferably the end 503 has an identical taper to that of the inlet opening 231. With such construction, the male coupling 501 wedges and locks into the inlet opening 231 during insertion. An operator may also rotate male coupling 501 about its longitudinal axis (axis 504) to aid in wedging the coupling 501 into the inlet opening 231. Such a tapered connection is commonly known as a "locking taper."

The adapter assembly 500 may further comprise a hose coupling 502 that may be telescopically connected to the male coupling 501. Preferably, a swivel connection is formed when both couplings 501, 502 are connected. Such swivel connection aids in preventing the hose 510 from becoming twisted during operation.

The swivel connection may be obtained by forming an annular groove in one of the two couplings and an annular rib in the other coupling, where the groove and rib are mateable with each other. As shown in FIGS. 22–23, the hose coupling 502 has an annular groove 505, for receiving an annular rib 506 formed on the male coupling 501, preferably on its inner surface. The couplings may then be assembled by inserting the male coupling 501 over the hose coupling 502 until the rib 506 is seated in the mating groove 506. To aid in making the connection, the forward wall of the rib 506 and the tip of the hose coupling 501 may be rearwardly tapered.

Hose coupling 502 may also have threads 509 for threadedly receiving threads 511 of hose 510.

Persons skilled in the art may recognize other alternatives to the means disclosed herein. However, all these additions and/or alterations are considered to be equivalents of the present invention.

What is claimed is:

1. A vacuum cleaner comprising:
   a tank assembly having an open end;
   an inlet assembly disposed on the tank assembly;
   a cap assembly removably connected to and generally closing off the open end, the cap assembly comprising a bottom wall substantially closing off the open end, a partition disposed on the bottom wall, and a cover disposed on at least one of the bottom wall and the partition;
   a motor disposed in the cap assembly;
   a fan driven by the motor disposed in the cap assembly for drawing process air through the inlet assembly;
   an exit opening disposed on the cap assembly;
   a filter assembly disposed between the inlet assembly and the exit opening;
   a ducting layer disposed between the fan and the exit opening and between the partition and the bottom wall; and an expansion chamber between the ducting layer and the exit opening;

wherein cooling air flows through the motor and between the partition and the cover, and process air flows through the filter assembly, the fan and between the partition and the bottom wall without commingling with the cooling air; and wherein the ducting layer has at least one protrusion or depression disposed in the path of process air for forcing the process air to make multiple turns prior to entering the expansion chamber.

2. The vacuum cleaner of claim 1, wherein the expansion chamber is defined by the partition and the bottom wall.

3. The vacuum cleaner of claim 1, wherein the ducting layer is made of rubber.

4. The vacuum cleaner of claim 1, wherein the ducting layer is made of high-density foam.

5. The vacuum cleaner of claim 1, wherein the ducting layer is made of a material substantially impenetrable by air.

* * * * *